United States Patent
Ahn et al.

(10) Patent No.: US 12,171,288 B2
(45) Date of Patent: Dec. 24, 2024

(54) READY-TO-USE EYELASH EXTENSIONS

(71) Applicant: Kiss Nail Products, Inc., Port Washington, NY (US)

(72) Inventors: Kichul Ahn, Jericho, NY (US); Jieun Kim, Woodside, NY (US); Jane Bang, Bayside, NY (US)

(73) Assignee: Kiss Nail Products, Inc., Port Washington, NY (US)

( * ) Notice: Subject to any disclaimer, the term of this patent is extended or adjusted under 35 U.S.C. 154(b) by 334 days.

(21) Appl. No.: 17/409,705

(22) Filed: Aug. 23, 2021

(65) Prior Publication Data

US 2022/0053862 A1 Feb. 24, 2022

Related U.S. Application Data

(63) Continuation of application No. PCT/US2021/047200, filed on Aug. 23, 2021.

(60) Provisional application No. 63/068,728, filed on Aug. 21, 2020.

(51) Int. Cl.
*A41G 5/02* (2006.01)
(52) U.S. Cl.
CPC ..................... *A41G 5/02* (2013.01)
(58) Field of Classification Search
CPC ....................................................... A41G 5/02
See application file for complete search history.

(56) References Cited

U.S. PATENT DOCUMENTS

| | | | |
|---|---|---|---|
| 3,935,872 A * | 2/1976 | Aylott | A41G 5/02 132/216 |
| 4,299,242 A | 11/1981 | Choe | |
| D632,019 S * | 2/2011 | Nguyen | D28/92 |
| 8,225,800 B2 * | 7/2012 | Byrne | A41G 5/02 132/216 |
| 10,433,607 B2 | 10/2019 | Ahn | |
| 2002/0056465 A1 * | 5/2002 | Shin | A41G 5/02 132/53 |
| 2009/0235950 A1 | 9/2009 | Dinh | |
| 2010/0043816 A1 | 2/2010 | Dix | |
| 2012/0180804 A1 | 7/2012 | Hochi et al. | |
| 2013/0160787 A1 | 6/2013 | Chae et al. | |
| 2016/0037848 A1 | 2/2016 | Lee | |
| 2018/0242671 A1 | 8/2018 | Merszei | |
| 2018/0352885 A1 | 12/2018 | Kim | |
| 2019/0183200 A1 | 6/2019 | Song | |

(Continued)

FOREIGN PATENT DOCUMENTS

| | | | |
|---|---|---|---|
| GB | 1519221 A | | 7/1978 |
| JP | 6130571 B1 * | | 5/2017 |

(Continued)

OTHER PUBLICATIONS

Roh et al. machine translation, Available Jun. 2018.*

*Primary Examiner* — Rachel R Steitz
*Assistant Examiner* — Brianne E Kalach
(74) *Attorney, Agent, or Firm* — Cherskov Flaynik & Gurda, LLC (57) ABSTRACT

An artificial eyelash extension system is described. The system uses a plurality of eyelash filaments. A support strip is attached to the bases of the eyelash filaments. An adhesive element is applied before the artificial eyelash extension system is packaged for sale to a user. A method for applying artificial eyelash extensions is also described.

19 Claims, 8 Drawing Sheets

(56) References Cited

U.S. PATENT DOCUMENTS

2019/0320750 A1   10/2019  Ho
2021/0059339 A1*   3/2021  Lee ..................... A41G 5/008

FOREIGN PATENT DOCUMENTS

| KR | 101507695 B1 | * | 4/2015 |
| KR | 20180050446 | * | 6/2018 |
| WO | WO 2015116247 | * | 8/2015 |
| WO | 2015116247 A1 | | 8/2016 |

* cited by examiner

READY-TO-USE EYELASH EXTENSIONS

The present application claims priority as a non-provisional to U.S. provisional filing 63/068,728 filed on Aug. 21, 2020. The present application also claims priority as a continuation of PCT application PCT/US21/47200, filed on Aug. 23, 2021. The contents of each application are hereby incorporated by reference.

BACKGROUND OF THE INVENTION

Field of Invention

The field of the invention is an eyelash extension system and method for applying same, and more particularly but not exclusively, artificial lashes having a pre-applied adhesive element.

Background

Artificial eyelashes are popular products that are used to improve the look of a user's lash line through the addition of lash length and/or volume. Such artificial eyelashes typically comprise a lash line strip with eyelash filaments extending from there. The eyelash filaments can be made from mink, synthetic materials, horsehair, and in some instances, human hair. Artificial eyelashes are typically applied by spreading adhesive on or around the lash line strip component of a lash extension and pressing the lash line strip to a user's lash line or proximate thereto. Such eyelash extensions can be difficult to apply and require that a user have access to both the extensions and specialized adhesives.

More recently, do-it-yourself, under-lash eyelash extension systems have been developed. In these systems, a strip of eyelash extensions is glued to the underside of a user's natural eyelashes in a similar fashion to more traditional above-lash extension systems. The do-it-yourself systems often come in small sections (e.g., wisp lashes, cluster lashes, individual lashes), allowing for an inexperienced user to apply the eyelash extensions without the difficulty of aligning a longer, single strip of eyelash extensions. However, these do-it-yourself systems still require the user to have and apply specialty adhesive either to their lashes or to the lash extension system before use.

A need exists in the art for eyelash extension systems that eliminate the difficulties of prior art systems. A need also exists for a means that easily facilitates a user to apply eyelash extensions without the drawbacks of existing systems.

SUMMARY OF INVENTION

An object of the invention is to create eyelash extensions that overcome many of the drawbacks in the prior art. A feature of the invention is that the eyelash extensions have pre-applied adhesive elements before being packaged for sale to a user. An advantage of the invention is that the eyelash extension system is ready to use without the need for any additional supplies such as glue. An additional advantage of the invention is that the user can apply the invented eyelash extension system quickly and with one hand.

A further object of the invention is to provide a ready-to-use eyelash extension system having a pre-applied adhesive that is easy for a user to apply. A feature of the invention is that the pre-applied adhesive is droplets of adhesive applied to the eyelash filaments of the eyelash extension system. Alternatively, the invention features double-sided tape as the pre-applied adhesive. An advantage of the invention is that users can apply the invented lash extension system without modifying the pre-applied adhesive.

Another object of the invention is to maintain a ready-to-use eyelash extension system in usable condition before use. A feature of the invention is the use of temporary overlayment of a pre-applied adhesive element that is removed before the use of the eyelash extension system. An advantage of the invention is that the pre-applied adhesive elements of the eyelash extension system are maintained in clean condition for use by a user.

Yet another object of the invention is to provide a lash extension system that is easily applied by a user onto their natural lashes. A feature of the invention is that the lash extension system adheres directly to the natural lashes of a user at a position not directly adjacent to the eyelid of a user. An advantage of the invention is that by adhering the lash extension system to the lashes of a user in a position spaced from the eyelid, the user avoids any pain and skin irritation associated with lash systems that are applied to the skin of the eyelid or adjacent thereto.

The invention provides an artificial eyelash extension system comprising a plurality of eyelash filaments, each having a base and a tip; a support strip attached to the bases of the eyelash filaments, an adhesive element applied to the plurality of the eyelash filaments before the artificial extension system is packaged for sale to a user.

Also provided is a method for applying artificial eyelash extensions comprising providing to a user an eyelash extension system already having an adhesive element disposed on the eyelash extension system before being packaged for sale to the user, moving the adhesive element of the eyelash extension system into contact with the user's natural eyelashes.

BRIEF DESCRIPTION OF THE DRAWINGS

The invention, together with the above and other objects and advantages, will be best understood from the following detailed description of the preferred embodiment of the invention shown in the accompanying drawings, wherein.

DETAILED DESCRIPTION OF THE INVENTION

In various embodiments, the invention provides a ready-to-apply eyelash extension system. The eyelash extension system comprises eyelash filaments extending from an eyelash support strip wherein the filaments feature adhesive elements for attachment to the natural eyelashes of a user. The eyelash extension system may be referred to as a lash extension system or an artificial eyelash extension system.

The foregoing summary, as well as the following detailed description of certain embodiments of the present invention, will be better understood when read in conjunction with the appended drawings.

As used herein, an element or step recited in the singular and proceeded with the word "a" or "an" should be understood as not excluding plural said elements or steps, unless such exclusion is explicitly stated. Furthermore, references to "one embodiment" of the present invention are not intended to be interpreted as excluding the existence of additional embodiments that also incorporate the recited features. Moreover, unless explicitly stated to the contrary, embodiments "comprising" or "having" an element or a plurality of elements having a particular property may include additional such elements not having that property.

The phrases "lash," "artificial eyelash," and "eyelash," as used herein, are interchangeable and refer to an apparatus that is not part of the wearer's body unless specifically indicated otherwise (e.g., phrases such as "natural eyelash" or "user's eyelash" refer to a part of the wearer's body).

Figure 1A:
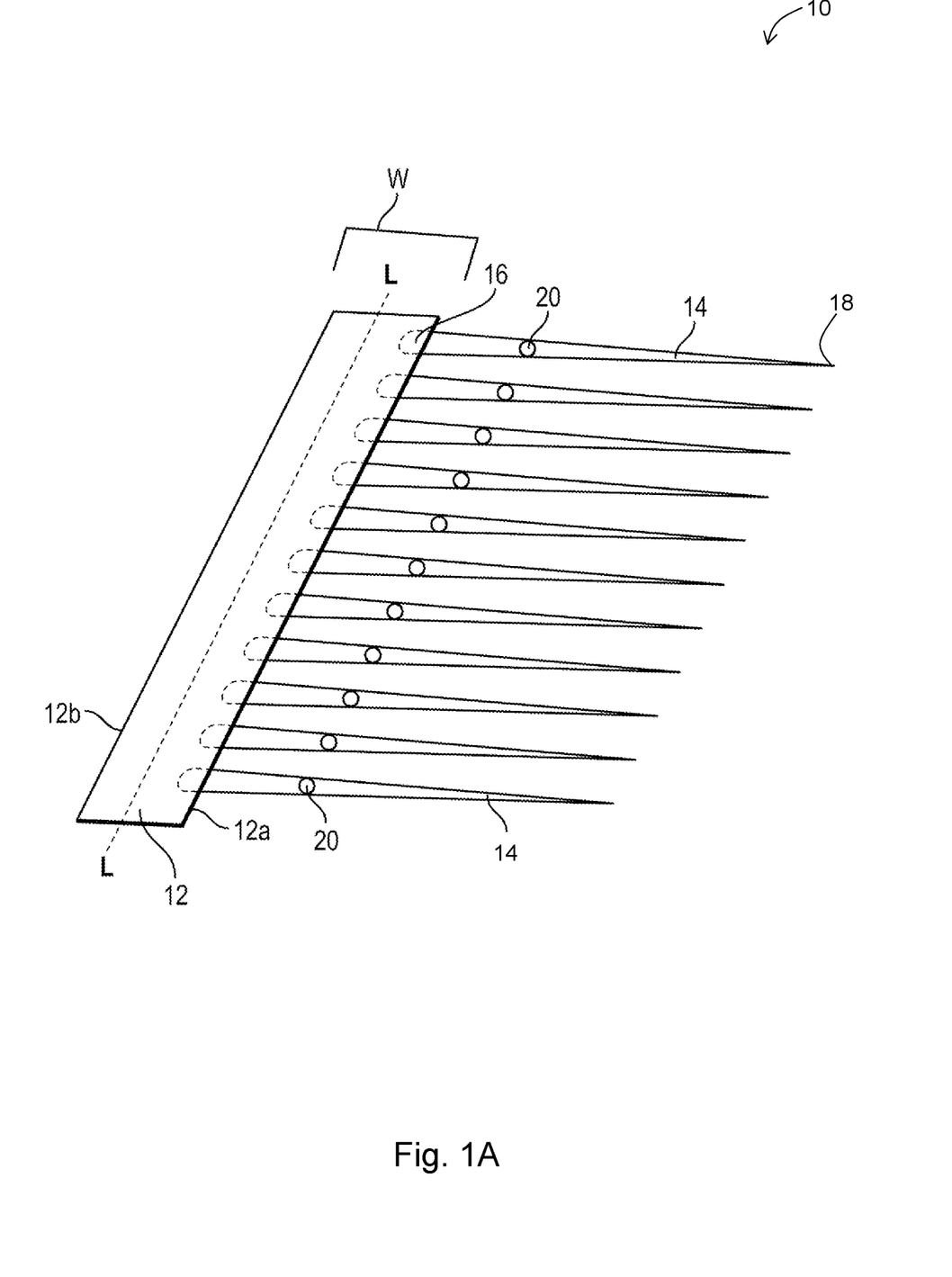
FIG. 1A depicts a perspective view of an eyelash extension system having pre-applied adhesive elements in accordance with the features of the invention.

Turning to the figures, FIG. 1A depicts a perspective view of one embodiment 10 of the invented lash extension system. The lash extension system may include a plurality of artificial eyelash filaments, a support strip, and an adhesive element. The lash extension system comprises a support strip 12 having a length L and width W. (The width W is a representation and not drawn to scale and may be narrower.) The support strip 12 may be attached to the bases of the eyelash filaments. The support strip 12 has a leading edge from which eyelash filaments 14 extend. The width W of the support strip 12 extends between the proximal edge 12a and the distal edge 12b of the support strip 12. As shown in FIG. 1A, the eyelash extension system 10 features eyelash filaments 14 extending between a base 16 and a tip 18. The bases 16 of the eyelash filaments 14 are embedded within and/or adhered to the support strip 12. In the exemplary embodiment shown in FIG. 1A, the bases 16 of the eyelash filaments 14 are spaced apart, with the eyelash filaments 14 extending away from the support strip 12 such that the lengths of the eyelash filaments 14 are substantially parallel and extending in a direction that is substantially perpendicular to the length L of the support strip 12.

While in FIG. 1A, the width W of the support strip 12 is about ten percent of the length of the filaments 14; in other embodiments, the width W of the support strip 12 is much smaller than the eyelash filaments 14. For example, in some embodiments, the width W is less than five percent of the length of the eyelash filaments 14. The larger width W is shown only for illustration purposes and to be able to show the structure of the support strip 12.

As can be appreciated from FIG. 1A, the eyelash filaments 14 have a variable length and arrangement. Some eyelash filaments 14 are substantially parallel, while other eyelash filaments 14 cross each other. The eyelash filaments 14 will have an average length resulting in a desired overall appearance of length of the eyelashes after application, in one embodiment.

The eyelash filaments 14 are made from conventional materials used in eyelash extensions. Suitable materials include materials having an appearance similar to human eyelashes. Exemplary materials include mink, horsehair, human hair, synthetic materials, and combinations thereof.

Materials used in the support strip 12 are well known in the art and include any suitable material for the attaching of the bases of eyelash filaments 14. Exemplary materials include PBT, nylon, cotton, silk, and combinations thereof.

A salient feature of the invented lash extension system 10 is the inclusion of an adhesive element 20 disposed on the eyelash filaments 14. The adhesive element 20 may be applied before the artificial eyelash extension system is packaged for sale to a user, to the plurality of the eyelash filaments. The adhesive element 20 may be applied at a position between the support strip and one-half the eyelash filaments' average length away from the support strip. The adhesive element 20 may be applied continuously to a predetermined location that is less than half of the eyelash filaments' average length away from the support strip. At least some of the adhesive element 20 is applied to the eyelash filaments 14 at the time of manufacturing of the system. FIG. 1A shows the adhesive element 20 disposed on each eyelash filament 14. The depiction of the location of the adhesive element 20 is meant to be exemplary and non-limiting. In several figures, the adhesive element 20 is shown as discrete droplets of adhesive. However, that depiction should not be limiting. In FIG. 1A, all eyelash filaments 14 are shown with an applied adhesive element 20. In some embodiments, not all eyelash filaments 14 will receive adhesive. In one embodiment, between one-half and three-fourths of all eyelash filaments comprising the artificial eyelash extension system receive the adhesive element. In other embodiments, the plurality of eyelash filaments comprises multiple layers, and only one layer of eyelash filaments receives the adhesive.

A benefit of the adhesive element 20 is that the lash extension system is ready to use without applying external adhesive, as will be described below.

While the figures depict the lash extension system as being used in conjunction with a full-strip artificial eyelash extension system, the same ready-to-use adhesive concepts may be used in conjunction with artificial eyelash extension systems of various styles, lengths, and sizes, such as smaller "wisp" eyelash systems (e.g., KISS Falscara Eyelash made by Kiss Products, Inc. located in Port Washington, NY) that are segmented versions of a full-strip eyelash systems and whose support strip lengths are one-half to one-fifth of a full-strip eyelash extension system's support strip length, or even smaller "cluster" eyelash systems (e.g., KISS Lash Couture LuXtensions, also made by Kiss Products, Inc.), or the smallest "flare" or "individual" eyelash systems (e.g., KISS i•ENVY Ultra Black Flare Short/Medium/Long, KISS i•ENVY Ultra Black 3D Individual Lash Medium/Long, all of which are also made by Kiss Products, Inc.) that may include only a few eyelash filaments 14 attached together at their bases.

The adhesive element 20 can be disposed on a plurality of eyelash filaments 14 across the entire length L of the support strip 12 or some fraction of the eyelash filaments 14, such as two-thirds, one-half, or one-third. It will be apparent to one having ordinary skill in the art that the fraction of eyelash filaments 14 having the adhesive elements disposed thereon can be adjusted according to the weight of the section of lash extension system 10 being used. For example, a lash extension system 10 designed for application to all of a user's natural lashes may require that all the eyelash filaments 14 have corresponding adhesive elements. Alternatively, a lash extension system 10 designed for attachment to some lesser portion of a user's natural lashes may only require that one half or a smaller proportion of eyelash filaments 14 bear corresponding adhesive elements.

As depicted in FIG. 1A, the adhesive element 20 can be discrete applications or droplets of an adhesive. The adhesive element 20 may be comprised of multiple discrete droplets of adhesive. The adhesive element 20 may be applied to an upward-facing surface of the eyelash filaments. In an embodiment, the adhesive element 20 is disposed at approximately the same position along the length of each eyelash filaments 14 away from the support strip 12. FIG. 1A shows the adhesive element 20 as small, flat sections of adhesive overlaying a portion of the eyelash filaments 14. In alternative embodiments, the adhesive element 20 may be non-cured droplets of adhesive.

Suitable adhesives for use in the instant invention include any adhesive that can be applied to the eyelash filaments 14 and retain stickiness while the lash extension system 10 is stored in packaging. Suitable adhesives can be applied to eyelash filaments 14, then stored without drying.

Figure 1B:
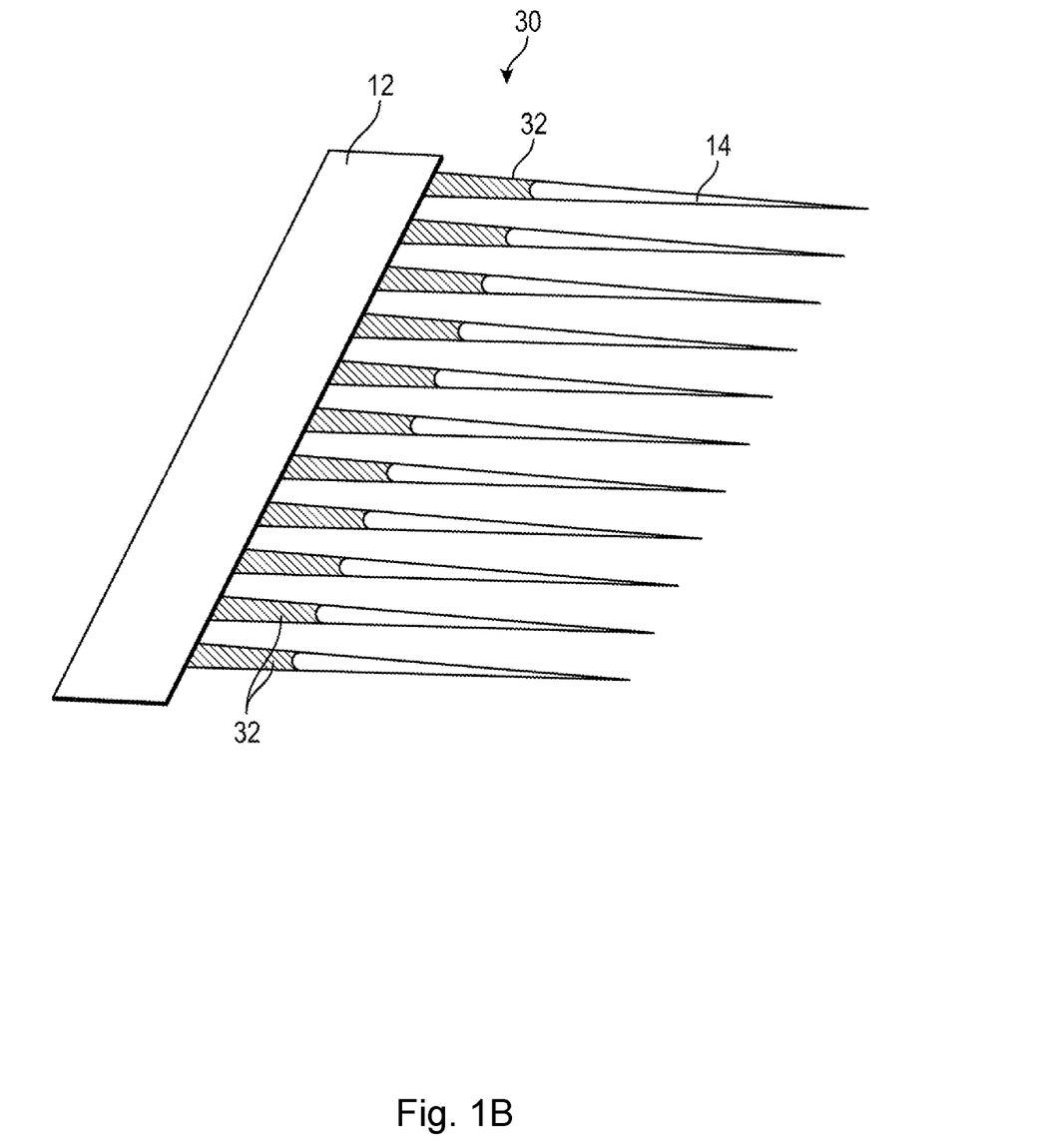
FIG. 1B depicts a perspective view of an alternative embodiment of an eyelash extension system having pre-applied adhesive elements in accordance with the features of the invention.

FIG. 1A shows the adhesive element 20 as discrete applications of adhesive on the eyelash filaments 14. An alternative embodiment 30 is shown in FIG. 1B. The lash extension system 30 shown in FIG. 1B features adhesive elements 32 extending continuously along the length of the eyelash filaments 14 starting from the support strip 12 to a defined position. In some embodiments, the length along the eyelash filaments 14 covered by the adhesive elements 32 is customized to the weight and other attributes of a lash extension set using the invented system. Preferably, the adhesive elements 32 will extend continuously on the first half to one-third of the average length of the eyelash filaments that extend from the support strip (i.e., the length of the eyelash filament embedded in the support strip is not included in this length). In alternative embodiments, the adhesive elements 32 are disposed continuously along lengths of the eyelash filaments 14 where the length is not proximate to the support strip (i.e., middle and tip portions of eyelash filaments). Yet, in another embodiment, the adhesive elements 32 may be applied continuously from a position between the support strip 12 and one-half of the eyelash filaments' average length. In other embodiments, the position is selected up to one-half of the eyelash filaments' average length from the support strip 12.

Figure 1C:
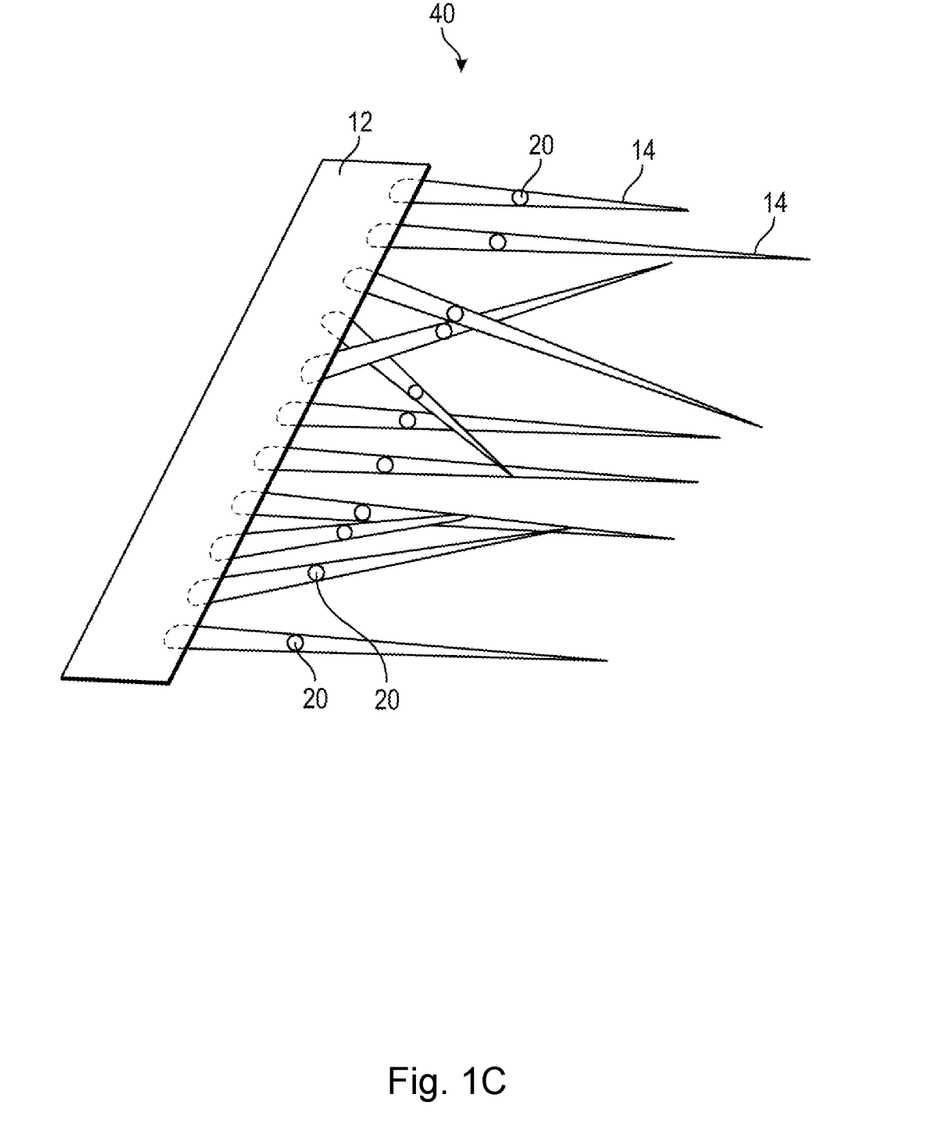
FIG. 1C depicts a perspective view of an alternative embodiment of an eyelash extension system having pre-applied adhesive elements in accordance with the features of the invention.

FIGS. 1A and 1B show the eyelash filaments 14 in the same direction and having similar lengths. In alternative embodiments such as the exemplary eyelash extension section 40 shown in FIG. 1C, the eyelash filaments 14 extend in different directions from the support strip 12 and can have different lengths. The eyelash filaments may extend from the support strip 12 such that at least some of the eyelash filaments overlap or cross one another. In one embodiment, the eyelash filaments may extend from the support strip 12 such that at least one-quarter of the eyelash filaments overlap or cross one another. The embodiment shown in FIG. 1C can utilize both the continuous and discrete applications of adhesive elements shown in FIGS. 1A and 1B. For example, the embodiment of FIG. 1C shows the adhesive element 20 much as show in FIG. 1A.

Figure 1D:
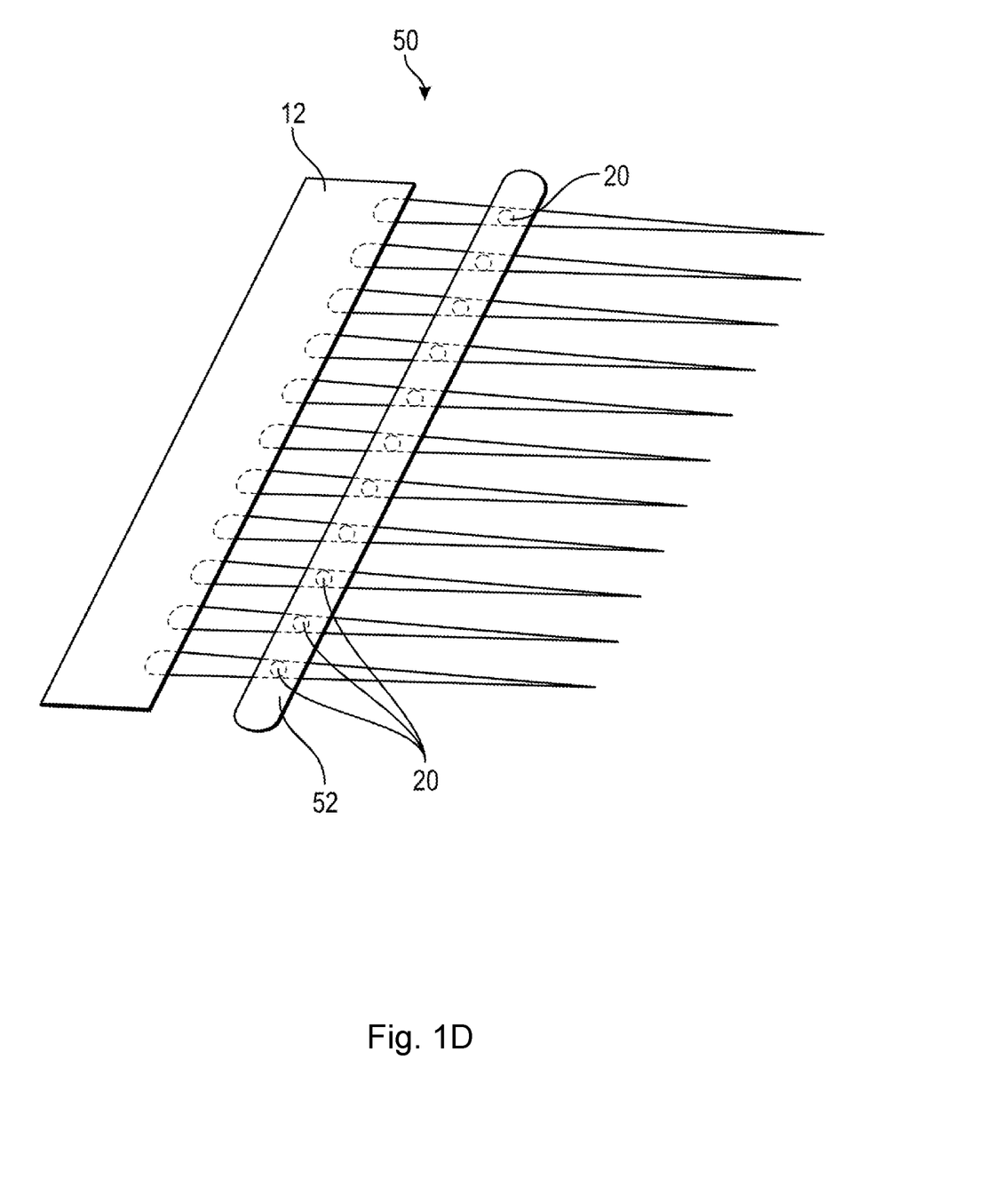
FIG. 1D depicts a perspective view an embodiment of an eyelash extension system having pre-applied adhesive elements overlaid by a temporary backing in accordance with the features of the invention.

FIG. 1D shows yet another embodiment 50 of the invented eyelash extension system. In this embodiment, the adhesive elements 20 (or like adhesive element 32 from FIG. 1B) are overlaid with an elongated substrate 52. The elongated substrate 52 may further include removably overlaying the adhesive elements. The elongated substrate 52 is a thin piece of material that is in removable contact with the adhesive elements 20 disposed on the eyelash filaments 14 extending from the support strip 12. This temporary overlayment of the adhesive elements 20 maintains the cleanliness of the adhesive elements 20 on the lash extension system 50 before a user is ready to apply the eyelash extension system and prevents the system from tangling or getting stuck to undesired surfaces or objects.

In the embodiment depicted in FIG. 1D, the bond between the eyelash filaments 14 and the adhesive elements 20 is stronger than the bond between the adhesive elements 20 and the elongated substrate 52. This relationship of bond strength corresponds with the ability of a user to peel off the elongated substrate 52 from the adhesive elements 20 without removing the adhesive elements 20 from the eyelash filaments 14 or otherwise damaging the lash extension system 50.

In an embodiment, the strength of the adhesion between the adhesive elements 20 and the elongated substrate 52 is tuned by selecting the thickness of an adhesive applied to the surface of the elongated substrate 52 that contacts the adhesive elements 20. Using particular adhesives on the elongated substrate 52, applying a thin layer of adhesive allows for easy removal of the elongated substrate 52 from the adhesive elements 20, while a thicker layer of adhesive will increase the strength of the bond between the elongated substrate 52 and the adhesive elements 20.

In another embodiment, the strength of the adhesion between the adhesive elements 20 and the elongated substrate 52 is tuned by applying a pre-glue (an adhesive that does not completely coalesce during storage of the stored eyelash extension system) to the surface of the elongated substrate 52 that is in contact with the adhesive elements 20.

FIGS. 1A-D show the adhesive elements applied on an upward-facing surface of the eyelash filaments 14 of an eyelash extension system. In these configurations, the invented eyelash extension system is removably attached to the underside of a user's natural lashes. In alternative embodiments, the adhesive elements are disposed on a downward-facing surface of the eyelash filaments 14 of an eyelash extension system. In this alternative embodiment, the eyelash extension system can be removably attached to the top of a user's natural lashes.

Figure 2A:
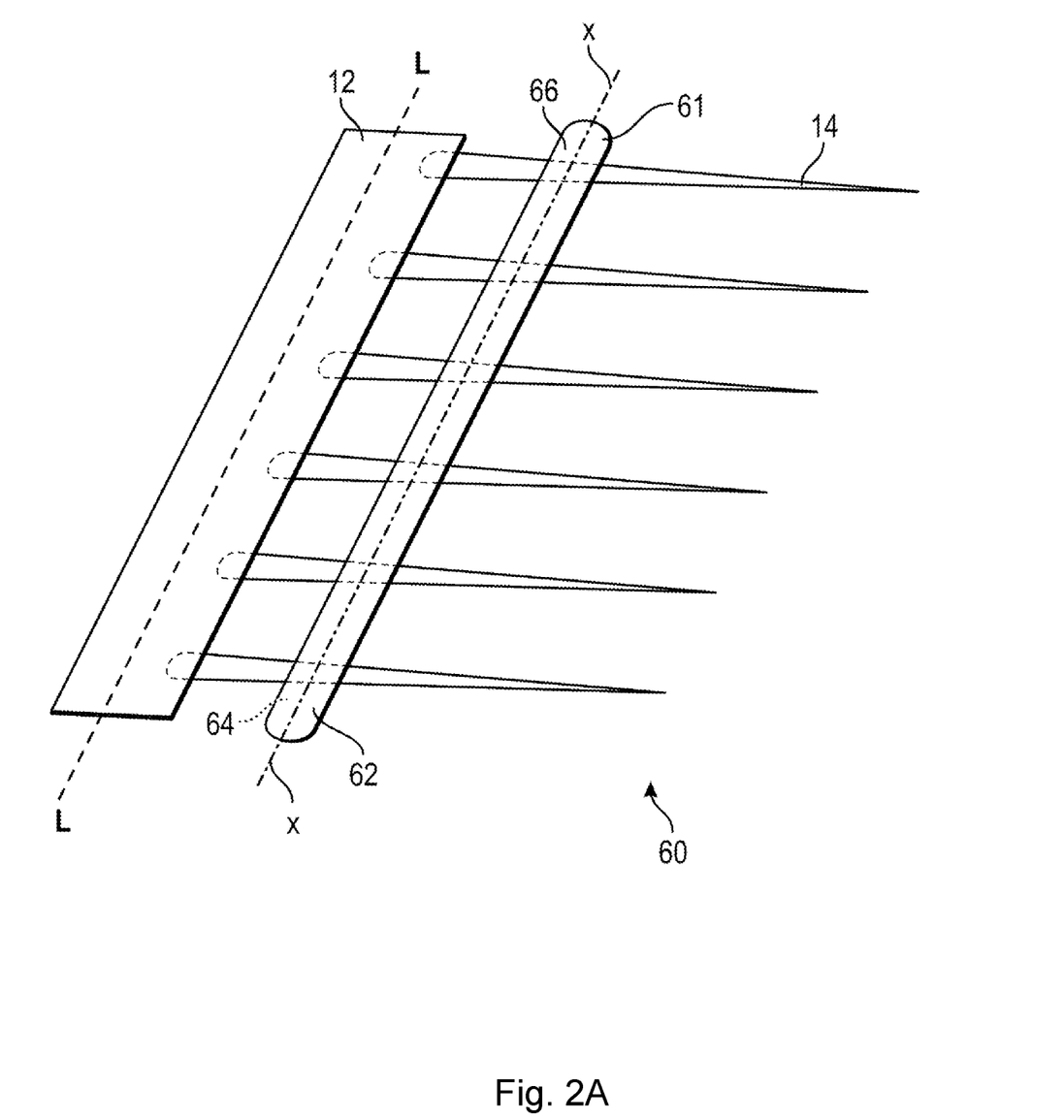
FIG. 2A depicts a perspective view of an embodiment of an eyelash extension system having an alternative pre-applied adhesive element in accordance with the features of the invention.

FIG. 2A shows another embodiment 60 of the invented lash extension system. This embodiment 60 features the same configuration of eyelash filaments 14 and support strip 12 as the embodiment shown in FIG. 1A. In this embodiment, however, the adhesive element 61 in this embodiment 60 is an elongated substrate 62 disposed across the eyelash filaments 14 such that the longitudinal axis x of the elongated substrate 62 is parallel with the length L of the support strip 12. The elongated substrate 62 may also be shorter than the length L of the support strip 12.

As shown in FIG. 2A, the elongated substrate 62 is disposed across the eyelash filaments 14 in a direction perpendicular to the length of the eyelash filaments 14. The adhesive element 61 may comprise an elongated substrate 62 having a longitudinal axis, an upward-facing surface 66, a downward-facing surface 64, and an adhesive disposed on the upward-facing and downward-facing surfaces, wherein the adhesive on the downward-facing surface contacts the eyelash filaments. The adhesive used on the upward-facing and downward-facing surfaces of the elongated substrate may be different. The lash extension system or artificial eyelash extension system may be adapted for the removal of the elongated substrate from the user's eyelashes without removing the elongated substrate from the eyelash filaments. The downward-facing surface 64 of elongated substrate 62 is secured to the eyelash filaments 14. The upward-facing surface 66 of the elongated substrate 62 features an adhesive or other sticky substance disposed thereon.

A person having ordinary skill in the art will readily appreciate that the elongated substrate 62 can be positioned across the eyelash filaments 14 anywhere along their length. Preferably, the elongated substrate 62 is positioned with its centerline (line x in FIG. 2A) disposed on the eyelash filaments 14 at a position corresponding to one-third to one-half of the length of the eyelash filaments 14 extending from the support strip 12. This positioning of the elongated substrate 62 is exemplary and not meant to be limiting. The elongated substrate 62 can reasonably be positioned over any portion of the eyelash filaments 14.

The elongated substrate 62 can be any suitable material for overlaying the eyelash filaments 14 without overly weighing down the lashes and without bending the lashes when worn by a user. Suitable materials for the elongated substrate 62 include double-sided tape and other types of thin strips with adhesives applied to both sides.

Figure 2B:
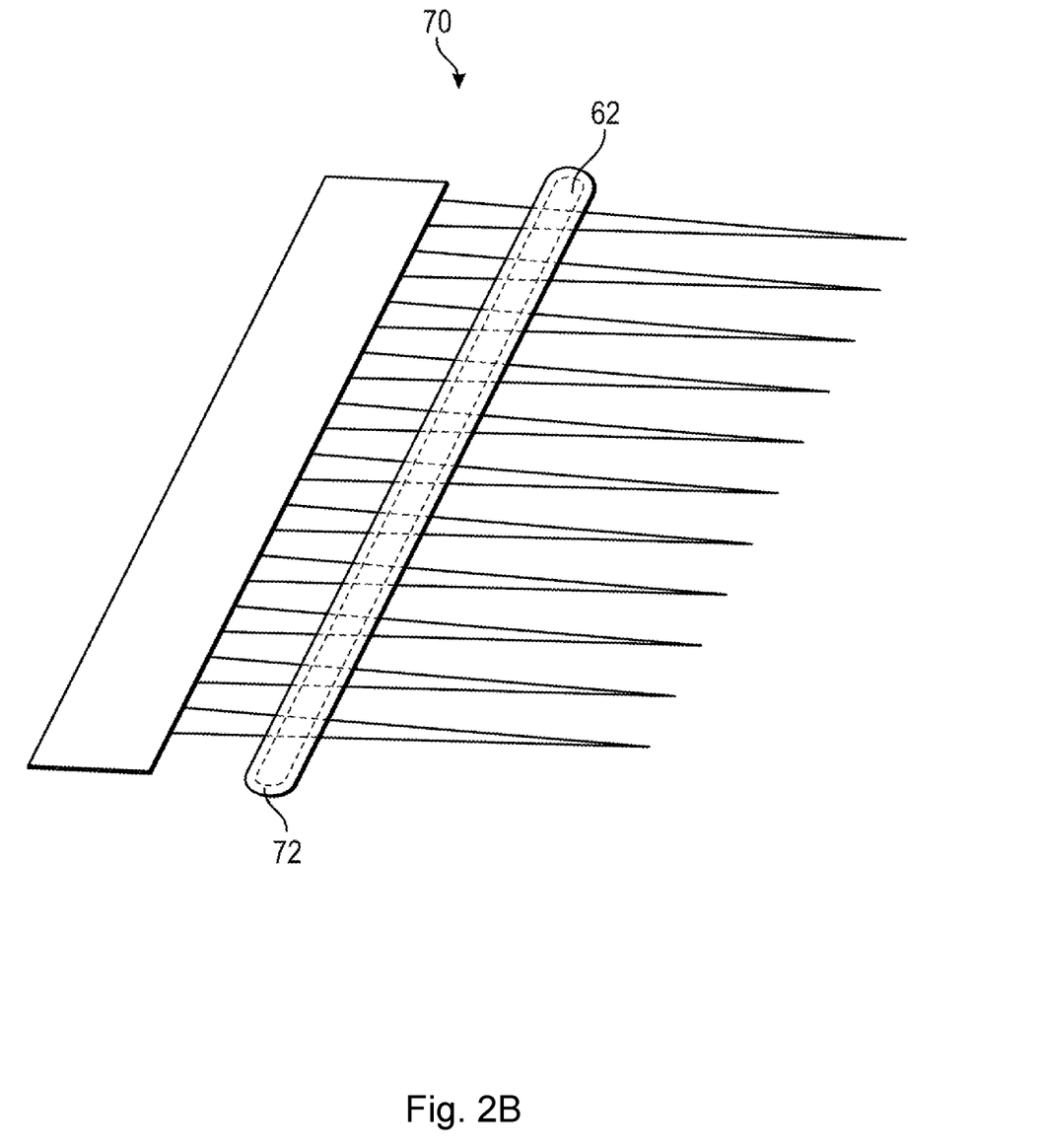
FIG. 2B depicts a perspective view of the invention embodiment shown in FIG. 2A featuring a temporary overlayment of the adhesive elements in accordance with the features of the invention.

A salient feature of this embodiment is the ability of a user to obtain the eyelash extension system 60 and use it without applying their own adhesives either to the system or their lashes. To enable this feature, the eyelash extension system 60 has to be ready to use when desired by a user. As such, the eyelash extension system 60 should not be stuck to undesired surfaces or objects and should feature clean adhesive disposed on the upward-facing surface 66 of the elongated substrate 62. As shown in FIG. 2B, in order to maintain the eyelash extension system 70 in a ready-to-use configuration, a backing (second elongated substrate) 72 is removably secured to the adhesive distributed over the upward-facing surface 66 of the elongated substrate 62. The system overlaid by the backing 72 is shown in the embodiment 70. This backing 72 is a temporary overlayment on the adhesive on the upward-facing surface of the elongated substrate 62 that prevents the eyelash extension system from sticking to undesired objects or becoming entrained with debris that would undermine the stickiness or appearance of the adhesive.

The backing 72 is double-sided in one embodiment. The backing 72 can be removably secured to the adhesive distributed over the upward-facing surface 66 of the elongated substrate 62, can be made from any material suitable for the temporary overlayment of the adhesive on the elongated substrate 62. Suitable materials include paper, plastic, fiber, and combinations thereof.

In an embodiment featuring the backing 72, the bond between the backing 72 and the first elongated substrate 62 is weaker than the bond between the first elongated substrate 62 and the eyelash filaments 14. This can be accomplished by forming a permanent bond between the first elongated substrate 62 and the eyelash filaments 14 and a temporary one between the backing 72 and the first elongated substrate 62. Alternatively, the adhesive contacting surface of the backing 72 is scored, frosted, or otherwise treated to prevent over sticking. These configurations are exemplary and not meant to be limiting. A person having ordinary skill in the art will understand that any configuration is suitable wherein the second elongated substrate (backing 72) can be removed from overlayment of the first elongated substrate 62 without ripping the first elongated substrate 62 from the eyelash filaments 14.

Figure 2C:
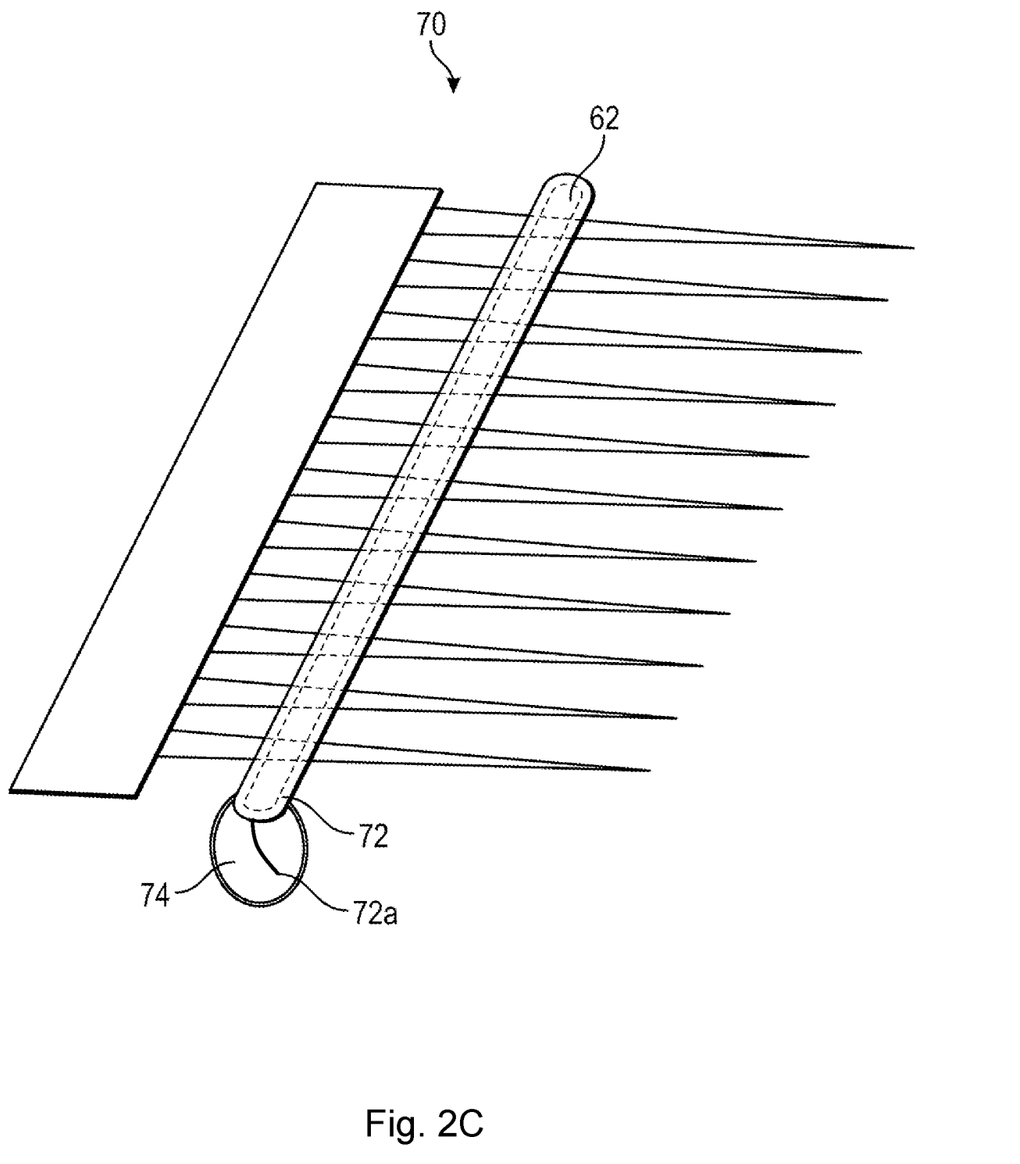
FIG. 2C depicts a perspective view of the invention embodiment shown in FIG. 2B featuring an alternative embodiment of temporary overlayment of the adhesive elements, in accordance with the features of the invention.

FIG. 2C shows the embodiment 70 of the invented eyelash extension system shown in FIG. 2B with the addition of an element that facilitates the removal of the backing 72 from the elongated substrate 62. As shown in FIG. 2C, the backing 72 can feature a terminating end 72a that extends past the periphery of the lash extension system and defines a tab 74. The tab 74 of the backing 72 can be the same shape as the rest of the backing 72. Alternatively, as shown in FIG. 2C, the tab of the backing 72 can feature a different and larger shape, such as a circular shape that gives a user a larger area to grab. In use, a user can grab the tab 74 and pull it toward the opposing end of the backing 72 to remove the backing 72 from the eyelash extension system.

Figure 3A:
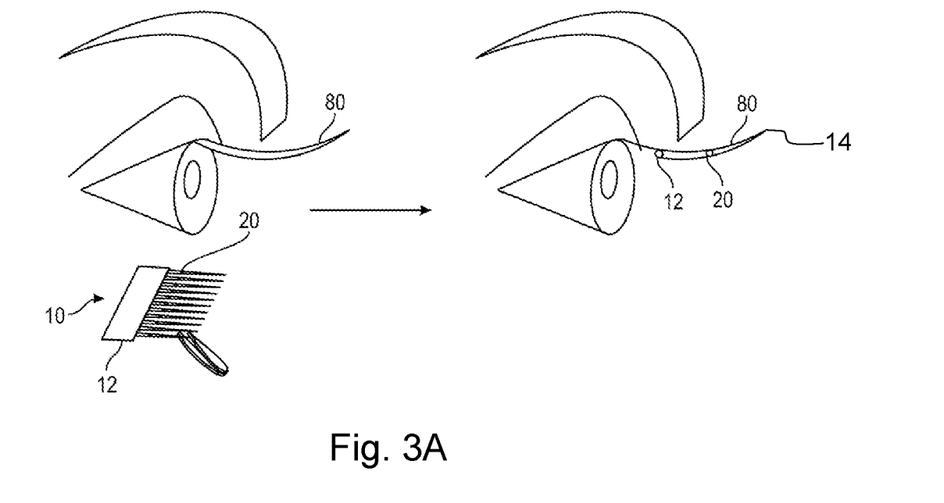
FIG. 3A depicts a schematic of using the eyelash extension system depicted in FIG. 1A in accordance with the features of the invention.

FIG. 3A depicts a schematic of a method of using the embodiment of the invention featured in FIG. 1A. The method for applying artificial eyelash extensions may comprise providing to a user an eyelash extension system already having an adhesive element disposed on the eyelash extension system before being packaged for sale to the user and moving the adhesive element of eyelash extension system into contact with the user's natural eyelashes. The step of moving the adhesive element of the extension system into contact with the user's natural eyelashes may comprise contacting an underside of the user's natural eyelashes with the adhesive disposed on the upward-facing surface of the elongated substrate. In the method, the user grasps the tip of eyelash filaments 14 and positions the lash extension system 10 under the user's natural lashes 80 to receive the lash extension system 10. The user's natural lashes 80 are the user's eyelashes in the depicted embodiment. The user then moves the lash extension system 10 upward so that the adhesive elements 20 of the eyelash filaments 14 contact the user's natural lashes 80.

The adhesive elements of the lash extension system can contact any portion of the underside of a user's natural lashes 80. Preferably, the adhesive elements of the lash extension system are put into contact with the user's natural lashes 80 such that the support strip 12 of the lash extension system underlies the underside of a user's natural lashes 80 or their eyelid.

A user applying any of the embodiments of the lash extension system described herein using an eyelash applicator such as the KISS Falscara Eyelash Applicator made by Kiss Products, Inc., located in Port Washington, New York. The Kiss applicator is one suitable eyelash applicator for use with the instant invention and is not meant to be limiting. A person having ordinary skill in the art will understand that many false lash applicators are suitable for use with the instant invention. Alternatively, a user may use their hand to grasp the invented lash extension system and move it into contact with the user's natural lashes.

A salient feature of the instant invention is its ready-to-use nature. Prior art lash systems require applying a bonding solution to the lash extensions and/or the natural lashes of a user before application. The pre-applied adhesive elements are suitable for immediate application to a user's lashes without further preparation of the lash extension system or the user's natural lashes.

After moving the lash extension system into contact with their natural lashes, the invented lash extension system will stay in place without any further pressing using their hand or an applicator. Further, no additional bonding solutions need to be applied. Once the invented lash system is in place, the user can optionally use the applicator or hand to adjust the precise position of the lash extension system or firmly squeeze the adhesive elements and natural lashes together. Surprisingly and unexpectedly, the inventors have discovered that the step of firmly pressing together their natural lashes and adhesive elements from the lash extension system is not necessary as it was in prior art systems. Similarly, the instant invention does not require the sandwiching of natural lashes between a lash extension system on the top of the lashes and one on the bottom of the lashes in order to form a lasting bond as is found in the prior art. Another significant feature of the instant invention is that the lash extension systems described herein can be applied using only one hand.

Use of Lash Extensions

FIG. 3A shows a general schematic for using the invented lash extension system once the adhesive elements are exposed. The embodiment shown in FIG. 1D, for example, first requires the removal of the temporary overlayment of its adhesive elements prior to adhering the lash extension system to the natural lashes of a user. A benefit of the system is that the extension can be worn without the application of additional adhesive.

Figure 3B:
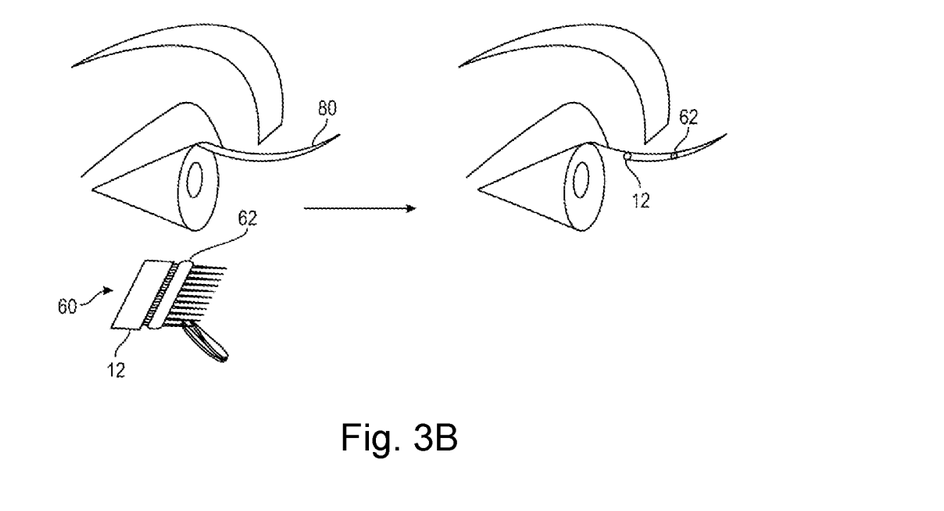
FIG. 3B depicts a schematic of using the eyelash extension system depicted in FIG. 2A in accordance with the features of the invention.

FIG. 3B shows a schematic of a method of using the embodiment of the lash extension system shown in FIG. 2A depicting the embodiment 60 having a support strip 12, and an elongated substrate 62. Similar to the schematic shown in FIG. 3A, the application of the lash extension system shown in FIG. 2A only requires one step, grasping the end of the eyelash filaments with a hand or applicator and moving the adhesive elements into contact with the desired portion of a user's natural lashes 80.

The adhesive element may further include a second elongated substrate temporarily overlaying the adhesive disposed on the upward-facing surface of the elongated substrate, and wherein that second elongated substrate is removed before moving the adhesive element of the extension system into contact with the user's natural eyelashes. Where the adhesive elements of the lash extension system shown in FIG. 2B are overlaid with a backing (second elongated substrate), the backing is removed prior to application of the lash extension system to a user's natural lashes.

After the application step in FIGS. 3A, and 3B, the user wears the invented lash extension system for a period of up to 24 hours. After wear, the user then grasps the unattached end of the worn lash extension system and gently pulls downward in order to remove the lash extension system from their eyelashes. The lash extension systems can then be stored for reuse. The lash extension systems, once removed, can be reused until their associated adhesive elements wear out. Alternatively, the original adhesive elements of the invented lash extension system can be rejuvenated or removed and replaced with new adhesive elements. Where a user removes the original adhesive elements from the invented lash extension system, the stripped system can then continue to be used as a lash extension system wherein a user applies their own glue.

The figures show the eyelash extension system having a length that approximates the length of a user's eyelid. This is exemplary and not meant to be limiting. In an embodiment, a user will apply only one lash extension system that removably underlies all or substantially all of a user's natural lashes. In such an embodiment, a user needs only apply one eyelash extension system to their natural lashes.

In alternative embodiments, the length of the support strips will be shorter and will require a user to apply more than one lash extension system in order to removably underlie all or substantially all their lashes. In yet another embodiment, a user will cut a longer strip of lash extension systems into a plurality of lash extension systems having desired lengths, forming a cluster of lash extension systems.

In one embodiment, the steps of use include applying additional glue, drying, and applying heat. The heat-activated adhesive becomes more pliant when heated. In this embodiment, the users will apply heat by using a heat applicator. In one embodiment, the heat applicator is a small heater included in the package. In another embodiment, the source of heat is a force-activated heat pack. In another embodiment, the heat source comprises a layer of material that heats up when exposed to the electromagnetic radiation found in a microwave oven.

When dried on the lashes, the glue is substantially solid. When heated, the glue changes states to a somewhat liquid or soft—jello-like, jelly-like, or pudding-like state. Such a state and is more comfortable to apply to the natural eyelashes.

Briefly, an embodiment provides a method for applying artificial eyelash extensions comprising: providing to a user an eyelash extension system already having an adhesive element disposed on the eyelash extension system before being packaged for sale to the user; and moving the adhesive element of eyelash extension system into contact with the user's natural eyelashes.

In some embodiments of the method, the eyelash extension system comprises a plurality of eyelash filaments, each having a base and a tip; a support strip attached to the bases of the eyelash filaments; and an adhesive element applied, before the artificial eyelash extension system is packaged for sale to a user, to the plurality of the eyelash filaments.

Further, in some embodiments, the user does not apply adhesive to their natural eyelashes. In some embodiments, the adhesive element comprises discrete droplets of adhesive. In some embodiments, the adhesive element is applied to an upward-facing surface of the eyelash filaments. In some embodiments, the adhesive element is applied continuously to a predetermined location that is less than half of the eyelash filaments' average length away from the support strip. In some embodiments, the adhesive element comprises an elongated substrate having a longitudinal axis, an upward-facing surface, a downward-facing surface, and an adhesive disposed on the upward-facing and downward-facing surfaces, and wherein the adhesive on the downward-facing surface contacts the eyelash filaments. In some embodiments, the step of moving the adhesive element of the extension system into contact with the user's natural eyelashes comprises contacting an underside of the user's natural eyelashes with the adhesive disposed on the upward-facing surface of the elongated substrate. In some embodiments, the adhesive element further comprises a second elongated substrate temporary overlaying the adhesive disposed on the upward-facing surface of the elongated substrate, and wherein that second elongated substrate is removed before moving the adhesive element of the extension system into contact with the user's natural eyelashes.

Although exemplary implementations of the invention have been depicted and described in detail herein, it will be apparent to those skilled in the relevant art that various modifications, additions, substitutions, and the like can be made without departing from the spirit of the invention and these are therefore considered to be within the scope of the invention as defined in the following claims.

It is to be understood that the above description is intended to be illustrative and not restrictive. For example, the above-described embodiments (and/or aspects thereof) may be used in combination with each other. In addition, many modifications may be made to adapt a particular situation or material to the teachings of the invention without departing from its scope. While the dimensions and types of materials described herein are intended to define the parameters of the invention, they are by no means limiting but are instead exemplary embodiments. Many other embodiments will be apparent to those of skill in the art upon reviewing the above description. The scope of the invention should, therefore, be determined with reference to the appended claims, along with the full scope of equivalents to which such claims are entitled. In the appended claims, the terms "including" and "in which" are used as the plain-English equivalents of the terms "comprising" and "wherein." Moreover, in the following claims, the terms "first," "second," and "third," are used merely as labels, and are not intended to impose numerical requirements on their objects. Further, the limitations of the following claims are not written in means-plus-function format and are not intended to be interpreted based on 35 U.S.C. § 112, sixth paragraph, unless and until such claim limitations expressly use the phrase "means for" followed by a statement of function void of further structure.

The embodiment of the invention in which an exclusive property or privilege is claimed is defined as follows:

1. An artificial eyelash extension system comprising:
a plurality of eyelash filaments, each having a base and a tip;
a support strip attached to the bases of the eyelash filaments; and
an adhesive element connected to the support strip and applied to the plurality of the eyelash filaments before the artificial eyelash extension system is packaged for sale to a user,
wherein the adhesive element is adapted to adhere to natural eyelashes of the user when the artificial eyelash extension system is applied, and
wherein the adhesive element extends from the support strip along a length of the eyelash filaments.

2. The system of claim 1 wherein the adhesive element is applied at a position between the support strip and one-half the eyelash filaments' average length away from the support strip.

3. The system of claim 2 wherein the adhesive element comprises an elongated substrate having a longitudinal axis, an upward-facing surface, a downward-facing surface, and an adhesive disposed on the upward-facing and downward-facing surfaces, wherein the adhesive on the downward-facing surface contacts the eyelash filaments.

4. The system of claim 3 wherein the adhesive on the upward-facing surface of the elongated substrate is removably overlaid with a second elongated substrate.

5. The system of claim 4 wherein the elongated substrate comprises a double-sided tape.

6. The system of claim 3 wherein the adhesive on the upward-facing surface and the adhesive on the downward-facing surface of the elongated substrate are different.

7. The system of claim 3 wherein the system is adapted for removal of the elongated substrate from the user's eyelashes without removing the elongated substrate from the eyelash filaments.

8. The system of claim 2 wherein the adhesive element comprises multiple discrete droplets of adhesive.

9. The system of claim 2 wherein the adhesive element is applied to an upward-facing surface of the eyelash filaments.

10. The system of claim 9 wherein the adhesive element is applied continuously from a position between the support strip and a one-half of the eyelash filaments' average length to a distance that is equal to or less than one-half of the eyelash filaments' average length.

11. The system of claim 1 wherein the adhesive comprises an adhesive that retains its stickiness during storage of the artificial eyelash extension system.

12. The system of claim 1 wherein the system is adapted to attach to the user's natural eyelashes without application of additional adhesive to said natural eyelashes.

13. The system of claim 1 further comprising an elongated substrate removably overlaying the adhesive element.

14. The system of claim 1 wherein between one-half and three-fourths of all eyelash filaments comprising the artificial eyelash extension system receive said adhesive element.

15. The system of claim 1 wherein the eyelash filaments extend from the support strip such that at least some of eyelash filaments overlap.

16. The system of claim 1 wherein the eyelash filaments extend from the support strip such that at least one-quarter of the eyelash filaments overlap.

17. The system of claim 1 wherein the eyelash extension system is a wisp, cluster, flare, or individual eyelash extension system.

18. The system of claim 13, wherein bond between the eyelash filaments and the adhesive element is stronger than bond between the adhesive element and the elongated substrate.

19. An artificial eyelash extension system comprising:
a plurality of eyelash filaments, each of the plurality of eyelash filaments comprising a base and a tip;
a support strip attached to the bases of the eyelash filaments; and
an adhesive element disposed on the support strip and disposed on a portion of the plurality of the eyelash filaments that extend outward from the support strip,
wherein the adhesive element is adapted to adhere to natural eyelashes of the user when the artificial eyelash extension system is applied.

* * * * *

UNITED STATES PATENT AND TRADEMARK OFFICE
CERTIFICATE OF CORRECTION

PATENT NO. : 12,171,288 B2  
APPLICATION NO. : 17/409705  
DATED : December 24, 2024  
INVENTOR(S) : Kichul Ahn, Jieun Kim and Jane Bang Page 1 of 1

It is certified that error appears in the above-identified patent and that said Letters Patent is hereby corrected as shown below:

In the Claims

Claim 11, Column 12, Line 17, amend "the adhesive" to "the adhesive element."

Claim 19, Column 12, Lines 47-48, amend "the plurality of the eyelash filaments" to "the plurality of eyelash filaments."

Claim 19, Column 12, Line 50, amend "the user" to "a user."

Signed and Sealed this  
Third Day of June, 2025

Coke Morgan Stewart  
*Acting Director of the United States Patent and Trademark Office*